United States Patent [19]

Collinucci

[11] Patent Number: 5,698,259
[45] Date of Patent: Dec. 16, 1997

[54] PROCESS FOR FORMING A GUIDELINE ON A ROAD SURFACE

[75] Inventor: Luigi Collinucci, Turin, Italy

[73] Assignee: Fiat Auto S.p.A., Turin, Italy

[21] Appl. No.: 548,427

[22] Filed: Oct. 26, 1995

Related U.S. Application Data

[63] Continuation of Ser. No. 173,403, Dec. 22, 1993, abandoned.

[30] Foreign Application Priority Data

Dec. 31, 1992 [IT] Italy ................... TO92A1062

[51] Int. Cl.⁶ ........................................ B05D 1/08
[52] U.S. Cl. .................... 427/136; 427/137; 427/250; 427/448; 427/449; 427/455; 427/456; 404/12; 180/168; 219/76.14
[58] Field of Search ................... 427/448, 449, 427/455, 456, 136, 137, 250; 404/93, 94, 12; 180/168; 219/76.14

[56] References Cited

U.S. PATENT DOCUMENTS

| | | | |
|---|---|---|---|
| 2,260,461 | 10/1941 | Kolts | 94/1.5 |
| 3,097,932 | 7/1963 | Goldheim | 29/195 |
| 4,361,202 | 11/1982 | Minovitch | 180/168 |
| 4,786,164 | 11/1988 | Kawata | 356/4 |
| 5,039,979 | 8/1991 | McClive | 340/438 |
| 5,318,143 | 6/1994 | Parker et al. | 180/168 |

FOREIGN PATENT DOCUMENTS

| | | |
|---|---|---|
| WO88/03303 | 5/1988 | European Pat. Off. . |
| WO90/04528 | 5/1990 | European Pat. Off. . |
| 3240498 | 5/1984 | Germany . |
| 8816153 | 4/1989 | Germany . |
| 87-133323 | 4/1987 | Japan . |
| 2274907 | 11/1990 | Japan . |
| 456713 | 11/1936 | United Kingdom . |

OTHER PUBLICATIONS

AWS Committee on Thermal Spraying "Thermal Spraying: Practice, Theory and Application", American Welding Society, (1985), p. 9 (no month).

39th IEEE Veh. Tech. Con., vol. 1, No. 39, May 3, 1989, pp. 443–445, Salesky 'electronic rails'.

Primary Examiner—Benjamin Utech
Assistant Examiner—Timothy Meeks
Attorney, Agent, or Firm—Knobbe, Martens, Olson & Bear, LLP

[57] ABSTRACT

A metal detector and distance sensor for a motor vehicle. A departure of the motor vehicle from a correct path indicated by one or two metal lines covered with paint in the road is signaled. The metals lines are formed by projecting a jet of metal in the gaseous state at high speed onto the road surface. A covering of paint is then formed over the metal line on the road surface. A turbine supplied by an air compressor projects the jet of metal in the gaseous state from a vehicle or a trailer having a metal supply device and a painting device thereon. A display indicates the direction of departure from the correct path and the distance separating the motor vehicle from a preceding vehicle. Alarm signals can be emitted upon the departure.

14 Claims, 3 Drawing Sheets

1

PROCESS FOR FORMING A GUIDELINE ON A ROAD SURFACE

CROSS-REFERENCE TO RELATED APPLICATION

This application is a continuation of U.S. application Ser. No. 08/173,403, filed Dec. 22, 1993, now abandoned.

The present invention basically tackles the problem of controlling the path and/or safety distance of vehicles such as for example motor vehicles.

BACKGROUND OF THE INVENTION

The invention has been developed with particular concern for its possible use in road safety systems, particularly for test tracks for motor vehicles. Such tracks are used by the main motor vehicle manufacturers for experimentation and for checking the characteristics of motor vehicles under very different conditions so as to reproduce, and very often exaggerate, specific critical situations typical of traffic circulation. There are, for example, circular tracks in which vehicles are subjected to long test cycles over a circular path with a large radius of curvature in order to check their operating characteristics in environments closed to traffic and hence with the possibility of checking the vehicle components with extreme precision and certainty. In these circuits and during these tests, which are often extremely repetitive and extend over long periods of time, it can happen that the attention of a vehicle test driver tends to slacken with a consequent tendency, by the vehicle, to deviate and depart from the path of the lane assigned to it (usually indicated by painted lines applied to the road surface as traffic signs) with the risk of collision with vehicles in adjacent lanes.

There is thus a need to provide path-control means which can prevent such dangerous situations from arising.

It has already been proposed in European Patent Application EP-A-0 452 280 to control the path of a motor vehicle, for example engaged in a test cycle on a track including one or more lanes identified by one or more continuous or broken guide lines on the road surface.

The lines are made with the usual paint for traffic signs which contain a dispersion of metal such as aluminium.

One or more sensors mounted on the motor vehicle and sensitive to the metal dispersed in the paint detect whether or not the motor vehicle is continuing to follow the lane assigned to it; if it is not, an audible and/or luminous signal is provided.

It has been shown by the Applicant that the inevitable, repeated passage of motor vehicles across the lines results in their abrasion, thus creating zones without metal particles and rendering the detectors on the motor vehicles ineffective. It is thus necessary to repaint the abraded zones with further paint containing the metal dispersion; in practice, the quantity of this metal needed for the maintenance may be fairly high, with considerable costs; moreover the dispersion of the abraded metal in the surrounding environment has a harmful ecological impact.

Furthermore, the indication solely of movement from the correct path does not enable a quick and safe evaluation of the direction in which the motor vehicle is moving; it is also felt necessary to indicate to a driver that he is approaching a preceding motor vehicle in the same lane in order to enable him to slow and avoid a collision.

SUMMARY OF THE INVENTION

The object of the present invention is to provide means which enable the requirements expressed above to be satisfied in an ideal way, particularly for the safety of vehicles on roads and on test tracks, without giving rise to the disadvantages of the previous solutions referred to above.

According to the present invention, this object is achieved by the process having the characteristics claimed specifically in the claims which follow. Further subjects of the invention are apparatus and a system for carrying out this process.

The invention will now be described, purely by way of non-limiting example, with reference to the appended drawings, in which:

DETAILED DESCRIPTION OF THE PREFERRED EMBODIMENT

Figure 1:
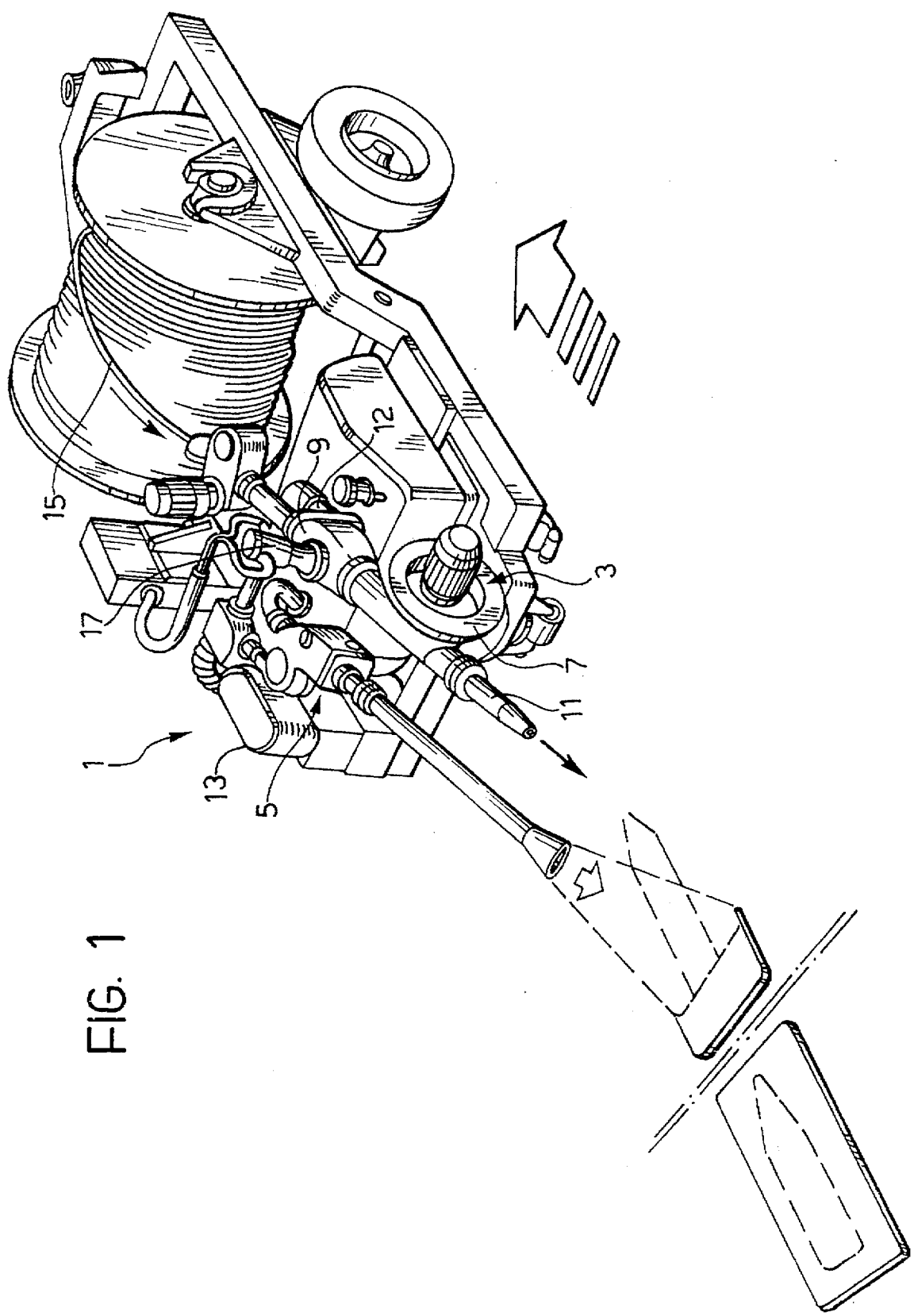
FIG. 1 illustrates the apparatus for forming guide lines for the application of the system according to the invention.

With reference to FIG. 1, a wheeled vehicle, whether self-powered or a trailer, is generally indicated 1 and includes a supply device indicated 3 for supplying metal in the vapour state and a device 5 for painting traffic signs on the road surface of the type in current and normal use by specialist manufacturers.

The device 3 is constituted by a supersonic turbine 7 having a first inlet 9 and an outlet 11; a second inlet 12 is connected to an air compressor 13.

A continuous metal wire 15, for example of aluminium, is fused instantaneously to form vaporized metal containing gaseous metal vapor entrained in air for example by means of an arc torch 17 and is supplied to the inlet 9 of the turbine 7. Torch 17 may be an electric arc torch.

In use, as the device 1 moves in the direction indicated by the arrow, the jet of metal from the torch 17, which is effectively vaporised, is accelerated by the air from the compressor 13 and further accelerated by the turbine 7 to an almost supersonic velocity and is projected through the outlet 11 onto the road surface. Thanks to the very small dimensions of the particles constituting the flow and their high velocity at impact, the metal adheres perfectly (with a certain penetration) to the rough surface of the road, creating an almost smooth surface and cooling and solidifying practically instantaneously.

The device 5 then sprays the paint, in known manner, onto this surface covering the underlying thin metal layer and thus creating the usual road signs which, in this case, form the guide lines according to the invention. The metal strips covered by paint may be continuous or broken, a continuous reduction in the quantity of metal needed being achieved in this second case; in this case the distance between one line and the next is such that, when one line ends, the metal detectors, of which more will be said below, can pick up the next.

The repeated passage of motor vehicles across the lines abrades the paint which must be renewed, as usual and inevitable for the maintenance of road signs without the underlying metal layer being damaged.

Figure 2:
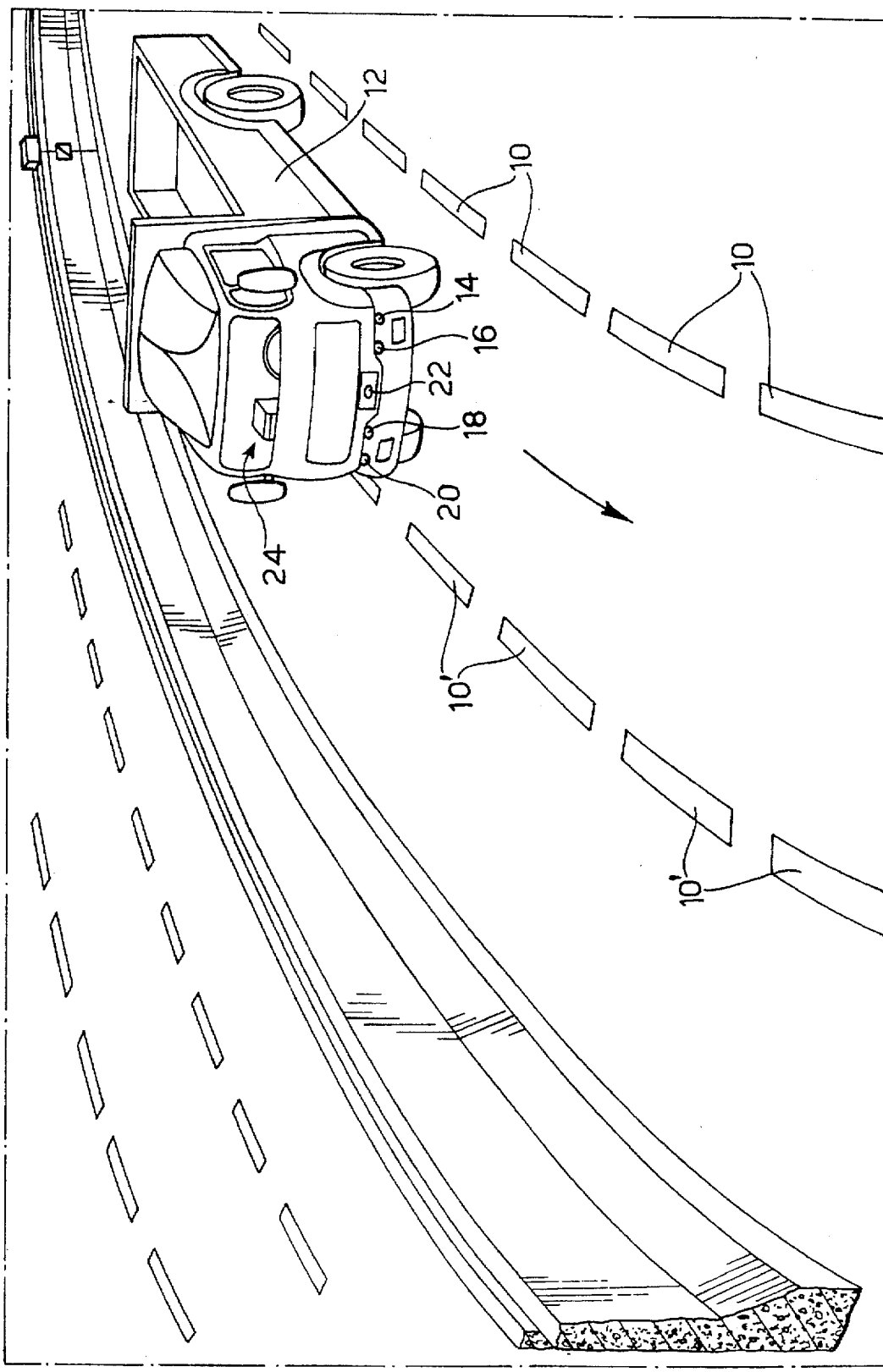
FIG. 2 shows schematically the assembly arrangement of a system according to the invention on a motor vehicle.

In FIG. 2, two road marker lines are indicated 10 and 10' and are formed in the manner just described to define a lane indicating the path which a motor vehicle 12 is to follow in its travel. The direction of movement of the latter being indicated by the arrow, the front part of the motor vehicle 12 includes metal detectors 14,16,18,20, for example of the type already described in European patent application EP-A-0 452 280.

A low-power, pulsed laser emitter-receiver module 22 is located in the front of the motor vehicle 12, the angle of the light beam emitted thereby being regulable.

The detectors 14,16,18,20 and the laser module 22 are connected to an indicator and control device 24 in the passenger compartment of the motor vehicle 12 and will be described below.

Figure 3:
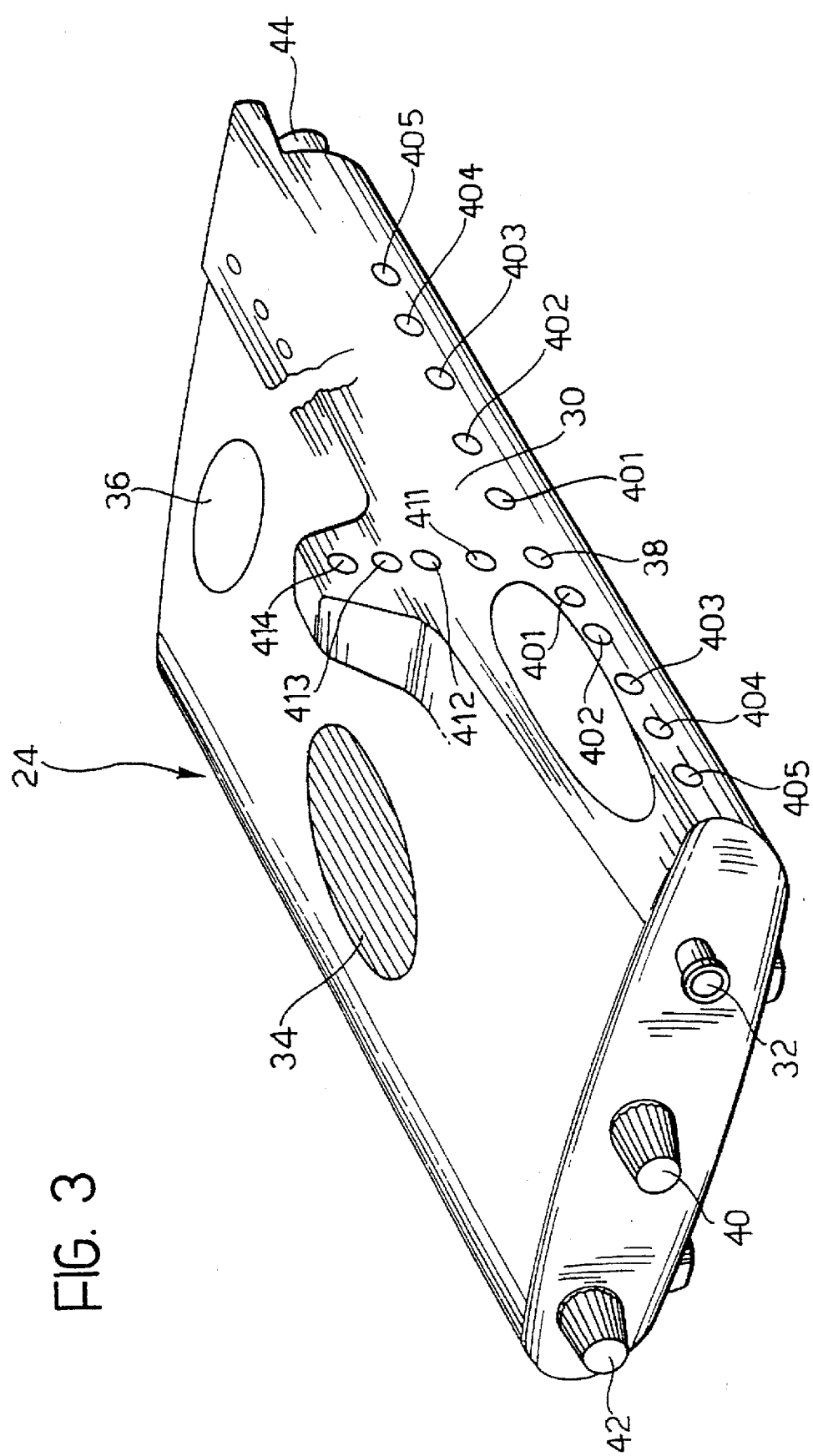
FIG. 3 shows the indicator device of the system according to the invention.

With reference to FIG. 3, the indicator and control device 24 mentioned above is shown by way of example in the form of a parallelepiped, containing the circuits and any programs necessary for processing the signals from the detectors 14,16,18,20 and from the laser module 22. After processing, these signals, or signals derived therefrom, are presented on a display 30.

The device 24 may also have apertures 34 and 36 for the transmission of audible signals, complementary to the optical ones present on the display 30, by means of a buzzer and a voice synthesiser.

The display 30 typically is in the form of an upside-down T-shape; at the centre of the T-shape is an optical indicator such as an LED 38, for example a green light; on the arms of the T-shape are a plurality of optical indicators, such as LEDs, for example five LEDs 401 to 405 for each horizontal arm and four LEDs 411 to 414 for the vertical arm. A reset push button 32 and controls 40,42 for regulating the brightness of the LEDs and the loudness of the buzzer respectively are also provided on the sides of the indicator and control device 24.

A multipolar socket 44 enables the device 24 to be connected to the detectors 14,16,18,20 and to the laser module 22.

The operation of the indicator and control device 24 will be explained with reference to FIGS. 2 and 3.

If the motor vehicle is travelling properly along its assigned path, the central green LED 38 is lit to indicate that the device 24 is active.

If a deviation from the path occurs (for example to the right), the detectors 20,18 in that order, detect the crossing of the line 10' and send a respective signal to the device 24 which, after detecting and interpreting (in known manner) the signal received, activates the LEDs 401 to 405 on the right hand arm of the display 30: simultaneously the central, green LED 38 is switched off.

The activation may, for example, start from the centre and proceed towards the ends in a repetitive, sequential manner with a high frequency of repetition, to render the direction of the deviation of the motor vehicle from its correct path visually perceptible.

If the driver sees the signal and corrects the path, the detectors 18,20, in order, retraverse the strip 10', confirm the return to the correct path and send a corresponding signal to the device 24. This latter then inverts the direction of lighting of the LEDs for several moments. Then the lateral LEDs 401 to 405 are switched off and the central green LED 38 is switched on again.

Were the device 24 to detect a passage across the line 10' by the detectors 20,18, in that order, it would not cancel the signal since it would interpret this as a crossing of another strip, that is the invasion of a second lane.

If the motor vehicle 12 crosses the strip 10 moving to the left, the sensors 14,16 concerned cause the central LED 38 to be switched off and the LEDs 401 to 405 on the left hand arm of the upside down T-shape to be switched on, with the same procedure just described for the right hand arm.

The actuation of the direction indicator inhibits the operation of the alarms which signal a departure from a path since it is presupposed, in this case, that there is a desired intention to leave the lane.

If, during its movement, the motor vehicle 12 approaches an obstacle on the same path, typically another motor vehicle, at a distance such that the laser signal emitted by the laser module 22 and reflected from the preceding vehicle, is picked up by the module 22, the latter, (in known manner), sends a related signal to the indicator and control device 24. In these conditions, the warning signal being received and recognised (in known manner), the device 24 switches off the central LED 38 and, in accordance with criteria similar to those described previously for indicating lateral movement by means of the LEDs 401 to 405, switches on the LEDs 411 to 414 on the vertical arm of the display 30, thus indicating to the driver the need to slow down.

When the motor vehicle returns to a safe condition, the device 24 switches off the LEDs 411 to 414 on the vertical arm and switches on the central green LED 38 again in a manner similar to that described for the horizontal arms. In each case, after an alarm signal has been maintained for a predetermined time (typically one to two seconds), the buzzer is activated, the voice synthesiser outputs alarm messages in clear, the hazard flashers are actuated and emergency measures are put into operation since, in this situation, it is presumed that the driver is going to fall asleep; then all the side windows may be lowered completely and immediately, air with atomised water etc may be blown in to obtain the driver's attention.

In each case, after a certain number of corrections have been made in a particular period of time (events indicated), for example four to five events in about 30 to 60 seconds, it is probable that the driver is no longer operating properly and the emergency measures just indicated are put into operation in any case.

The reset push button 32 is used to return the system to a waiting condition when the motor vehicle is travelling on tracks or roads which are not provided with the system according to the invention; the system will be put back into operation automatically when the guide lines are detected as described.

In a further embodiment, not illustrated, the path which must be followed by the motor vehicle may be indicated by a single guide line 10 applied by the technique described above in the middle of a lane defined, for example, by the usual road paint.

In this case the motor vehicle 12 provided with the detectors 14,16,18,20 and the laser module 22 for keeping the motor vehicle to a path must remain astride the guide line 10.

Any departure from the path, for example to the right, will be indicated by the detectors in the order 16,14 and return to the correct path by the detectors in the order 14,16; a departure to the left will be indicated in a similar manner by the detectors 18,20; naturally the type of signalling and the alarms will remain as described above.

This arrangement of guide lines is particularly advantageous when a path to be travelled is very close to a ditch or guard rail such that signalling of the crossing of a guide line disposed as in FIG. 2 would be rather late in that the driver would not have time to correct the path.

In a further embodiment according to the invention, not illustrated, a second laser module is provided in the rear part of the motor vehicle and is connected to the indicator and control device 24 to warn the driver that a motor vehicle on the same path of travel is catching up with him, with the danger of him being bumped, thus inducing him to accelerate.

In this latter embodiment, the display 30 may easily be modified to a general cross-shape by the addition of a lower vertical arm with LEDs in a configuration symmetrical with, and mirror imaged with respect to, those of the upper arm (LEDs 411 to 414).

The switching on of this further vertical arm, its switching off and the audible warnings for this further information are identical to those described previously for the upper vertical arm.

From what has been described, the advantages and utility of the system according to the invention will be clear since it provides, in essence, an anti-snaking, anti-sleep, anti-collison system.

The system signals to the driver the departure from and return to the correct path (snaking), the optical and audible signals emitted by the signalling unit together with the emergency measures indicated keep the driver's attention alive, avoiding the well known and dangerous phenomenon "nodding-off" as well as unforseen distractions.

The laser module, by virtue of the adjustability of the amplitude of the beam emitted, provides an effective anti-collision system which warns the driver only of obstacles present in the path of the motor vehicle and does not make him have to distinguish between obstacles which are not in the path of the motor vehicle and those which are (in the path) as is the case, for example, with the use of radar systems which scan the whole scene and not just a narrow part thereof, that is the path indicated by the or each guide line.

Clearly variations may be made to what has been described, for example, the metal used for the preparation of the guide lines could be varied widely with the use of zinc or another suitable metal; it could be supplied in the form of bars or otherwise and could be fused by a laser, plasma torch or the like. The laser devices could be replaced by or integrated with radar devices or other means which are able to evaluate distances between objects. The number of metal detectors could be varied widely as could the method of presentation of the danger signals and the form of the indicator unit.

What is claimed is:

1. A process for forming on a road surface at least one guide line which contains metal detectable by a metal detector, comprising the steps of:

fusing metal in an arc torch and producing a jet of vaporized metal;

accelerating the jet of vaporized metal by compressed air;

further accelerating the jet of vaporized metal in a turbine;

projecting the resulting jet of vaporized metal onto a road surface to form a metal coating on a portion of the road surface; and covering the metal on the road surface with paint.

2. A process as defined in claim 1 wherein the step of accelerating the jet of vaporized metal in a turbine accelerates the metal to an almost supersonic velocity.

3. A process as defined in claim 2 comprising the further step of mounting a device in an automotive vehicle or trailer to perform the steps of fusing metal, accelerating the jet of vaporized metal by compressed air and a turbine, projecting the resulting jet of metal onto a road surface, and covering said metal with paint.

4. A process as defined in claim 2, wherein the metal is fused to form vaporized metal containing gaseous metal vapor entrained in air, wherein the step of accelerating the jet of vaporized metal in a turbine accelerates the metal to an almost supersonic velocity, and wherein the metal is zinc or aluminum.

5. A process as defined in claim 1 wherein the jet of metal is projected onto the road surface at an almost supersonic velocity.

6. A process as defined in claim 5 comprising the further step of mounting a device in an automotive vehicle or trailer to perform the steps of fusing metal, accelerating the jet of vaporized metal by compressed air and a turbine, projecting the resulting jet of metal onto a road surface, and covering said metal with paint.

7. A process as defined in claim 5, wherein the metal is aluminum.

8. A process as defined in claim 5, wherein the metal is zinc.

9. A process as defined in claim 1 comprising the further step of mounting a device in an automotive vehicle or trailer to perform the steps of fusing metal, accelerating the jet of vaporized metal by air compressed air and turine, projecting the resulting jet of metal onto a road surface, and covering said metal with paint.

10. A process as defined in claim 9, wherein the metal is aluminum and the arc torch is an electric arc torch.

11. A process as defined in claim 9, wherein the metal is zinc and the arc torch is an electric arc torch.

12. A process as defined in claim 1, wherein the metal is aluminum.

13. A process as defined in claim 1, wherein the metal is zinc.

14. A process as defined in claim 1, wherein the metal is fused to form vaporized metal containing gaseous metal vapor entrained in air and wherein the step of accelerating the jet of vaporized metal in a turbine accelerates the metal to an almost supersonic velocity.

* * * * *